Feb. 15, 1944.  E. MESTITZ  2,341,938
ELECTRIC SOLDERING DEVICE
Filed Oct. 23, 1942
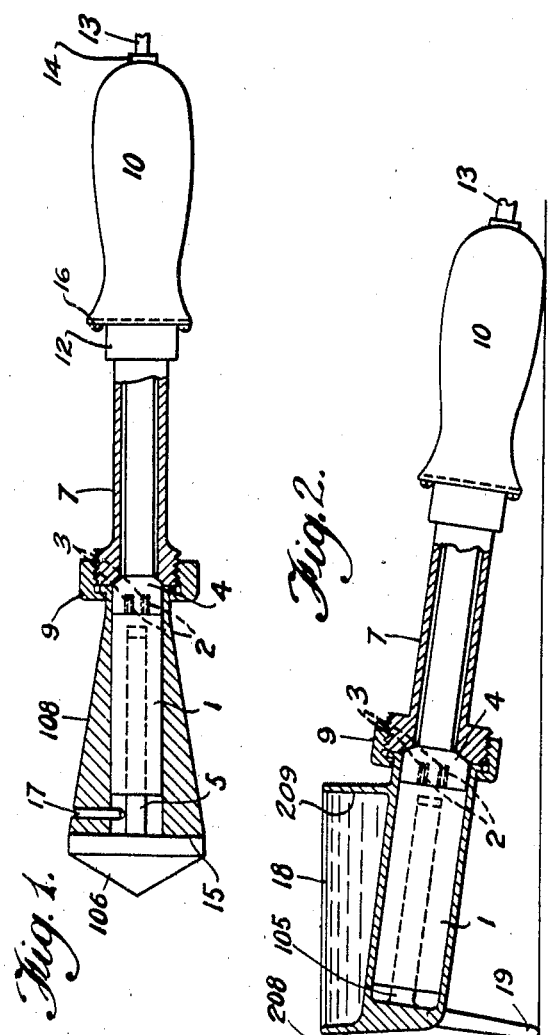
INVENTOR
ERVIN MESTITZ
BY Frederick C. Howe Patented Feb. 15, 1944

2,341,938

UNITED STATES PATENT OFFICE 2,341,938

ELECTRIC SOLDERING DEVICE

Ervin Mestitz, Llandaff, Cardiff, Wales

Application October 23, 1942, Serial No. 463,047
In Great Britain October 3, 1941

5 Claims. (Cl. 219—26)

This invention relates to improvements in electric soldering devices of the type comprising a structural combination of a part which is heated to soldering temperature, an electric heating element, means for conducting electric current to the heating element and means for holding the heated part and the heating element.

An object of this invention is to make the heating element readily interchangeable or removable. Another object is to provide co-operating electric contacts of a two-part coupling type on the heating element and on its holder. Another object is to utilise the two-part coupling contacts as a means for mechanically supporting the heating element on its holder. Another object is to provide a readily removable and interchangeable enclosure for the heating element. A further object is to provide such enclosures of different shape to suit different soldering processes. Another object is to provide a removable enclosure for the holder of the heating element and means for connecting together the enclosure for the heating element and the enclosure for the holder so that they can be easily disconnected. Another object is to provide means for increasing the heat transport from the heating element to the part to be heated to soldering temperature. Another object is to provide connecting means between a wooden handle of the device and an enclosure for the holder of the heating element which are suitable to hinder the heat transport from the heated part to the handle.

These previously enumerated objects and other objects of the invention secure easy replacement and enable spare heating elements to be kept in stock and interchanged or replaced as required. Furthermore according to this invention an interchangeable enclosure for the heating element is arranged to be heated by the latter and to conduct heat from the heating element to the work.

A soldering device according to this invention comprises an interchangeable heating element, a holder and a removable enclosure for the same and co-operating contacts of a two-part coupling type which are provided on the heating element and on the holder so as to ensure electrical connection and mechanical support of the heating element. A removable enclosure for the holder of the heating element can be provided to form an intermediate part between the enclosure for the heating element and a wooden handle of the device.

I am using enclosures of tubular shape connected together by a coupling ring which is rotatably mounted upon one enclosure and adapted to be screwed to a threaded part of the other enclosure. A wooden handle of the device can be fitted with a metal ring to which the enclosure for the holder of the heating element is secured.

The enclosure for the heating element is of conical shape with its thicker end adapted to hold a soldering bit.

Another enclosure for the heating element may be shaped with an open recess suitable to hold a quantity of liquid solder and to be used for dip-soldering, sweating and like. Such an enclosure may be fitted with legs which are so arranged that the opening of the recess holding the soldering metal is horizontal when the legs and handle of the device rest on a horizontal surface.

More details will be apparent from the following description referring to the accompanying drawing which shows by way of example several embodiments of this invention.

Figure 1 shows a soldering device according to the invention fitted with a conical housing for the heating element, and Figure 2 shows a device with a housing for the heating element and a reservoir for storing a supply of soldering metal.

In all the embodiments 1 is an electric heating element of a resistor type. It is provided with two flat or round contacts 2 projecting over the insulating body of the heating element. Co-operating counter-contacts 3, which form a two-part coupling with the contacts 2 are arranged on a holder 4 for the heating element. The reversed arrangement is of course also possible. A portion 5 of a soldering bit 6 is gripped by a screw 17 and projects into a hollow space of the heating element 1. The holder 4 and the heating element 1 are arranged in metallic housing 7 and 108 and connected together by a coupling ring 9, rotatably mounted on housing 108 and adapted to be screwed to a threaded portion of housing 7. A hollow wooden handle 10 is fitted with a metal ring 11 to which housing 7 is detachably secured by means of a flange 12 and screws 16. A cable 13 enters into the handle 10 through a rubber sleeving 14 and is connected to the contacts 3.

After removal of the coupling ring 9 and enclosure 8 the heating element 1 is accessible and can be easily replaced.

Housing 7 is of tubular shape and housing 108 has conically shaped outer walls and cylindrically shaped inner walls. The thicker end of housing 108 is adapted to receive a soldering bit 106 and its thinner end is fastened to housing 7 of holder 4 of the heating element. A shoulder 15 formed between the projecting portion 5 of the soldering bit 106 and its body is arranged to abut against the thicker end of the conical housing 108.

The enlarged metallic cross section near the thicker end of the enclosure 108 improves the heat transfer from the heating element 1 to the bit 106 and permits the use of heating elements of higher capacity and also an increased working temperature at the soldering bit.

According to the embodiment shown in Figure 2 a housing 208 for the heating element 1 is provided. An elongated cup-like reservoir 209 for storing a supply of liquid soldering material is fastened laterally of and longitudinally to said housing 208. This reservoir increases in depth from one end to the other and is detachably connected to housing 7 for holder 4 of the heating element 1 by means of ring 9. Legs 19 are provided to afford a horizontal position of the rim of reservoir 209 when the device rests on the legs 19 and handle 10 to which housing 7 is secured. A portion 105 projecting into a central recess of the heating element 1 is fastened to housing 208.

The heating resistance may comprise a number of sections fitted with individual sets of contacts and the holder may be provided with suitable counter-contacts.

Having described the invention what is claimed as new and desired to be secured by Letters Patent is:

1. An electric soldering device of the type described comprising a cylindrical heating element, a holder for the same, cooperating contacts of a two-part coupling provided on the heating element and on the holder for electrically connecting and mechanically supporting said heating element, a tubular housing for said holder, a handle, means for fastening one end of said housing to said handle, a removable tubular housing for said cylindrical heating element, said second housing having cylindrical inner walls and conically shaped outer walls, a soldering bit having a plane surface and placed with said surface against the thicker end of said conical housing, said plane surface and said thicker end of said second tubular housing having substantially the same diameter, a threaded coupling ring, rotatably mounted on the tapered end of said housing for the heating element and a threading provided on the end of the housing for said holder remote from said handle, said coupling ring being adapted to be screwed unto said housing for said holder.

2. An electric soldering device of the type described comprising a cylindrical tubular heating element, a holder for the same, cooperating contacts of a two-part coupling provided on the heating element and on the holder for electrically connecting and mechanically supporting said heating element, a tubular housing for said holder, a handle, means for fastening one end of said housing to said handle, a removable tubular housing for said cylindrical heating element, said second housing having cylindrical inner walls and conically shaped outer walls, a soldering bit having a plane surface and placed with said surface against the thicker end of said conical housing, said plane surface and said thicker end of said second tubular housing having substantially the same diameter, a mandrel attached to the plane surface of said bit and extended into said tubular heating element, means for securing said bit in its position, a threaded coupling ring rotatably mounted on the tapered end of said housing for the heating element and a threading provided on the end of said housing for said holder remote from said handle, said coupling ring being adapted to be screwed unto said housing for said holder.

3. An electric soldering device of the type described comprising a cylindrical tubular heating element, a holder for same, cooperating contacts of a two-part coupling provided on the heating element and on the holder for electrically connecting and mechanically supporting said heating element, a tubular housing for said holder, a handle, means for fastening one end of said housing to said handle, a removable housing closed at one end for said cylindrical tubular heating element, a mandrel attached to the closed end of said housing and extended into said heating element, an elongated cup-like reservoir for storing a supply of a soldering material fastened laterally of and longitudinally to said removable housing, said reservoir increasing in depth from one end to the other, legs secured to said removable housing for supporting said housing in a position in which the rim of said reservoir is approximately horizontal, while said legs and said handle are resting on a substantially horizontal surface, a coupling ring mounted upon said housing for said heating element and a threading provided on said housing for said holder, said coupling ring being adapted to be screwed on to said threading.

4. An electric soldering device of the type described comprising a cylindrical tubular heating element, a holder for the same, cooperating contacts of a two-part coupling provided on the heating element and on the holder for electrically connecting and mechanically supporting said heating element, a tubular housing for said holder, a handle, means for fastening one end of said housing to said handle, a removable housing closed at one end for said cylindrical tubular heating element, a mandrel attached within said housing at its closed end and extended into said heating element, an elongated cup-like reservoir for storing a supply of soldering material disposed laterally of and longitudinally to said removable housing, the walls of said reservoir being integral with said removable housing and the depth of said reservoir increasing toward the handle, legs extending from said removable housing near its closed end for supporting said housing in a position in which the rim of said reservoir is approximately horizontal while said legs and said handle are resting on a substantially horizontal surface, a coupling ring mounted upon said housing for said heating element and a threading provided on said housing for said holder, said coupling ring being adapted to be screwed on to said threading.

5. An electric soldering device of the type described comprising a cylindrical heating element, a holder for the same, cooperating contacts of a two-part coupling provided on the heating element and on the holder for electrically connecting and mechanically supporting said heating element, a tubular housing for said holder, a handle, means for fastening one end of said housing to said handle, a removable housing for said heating element, an elongated cup-like reservoir for storing a supply of a soldering material fastened laterally of and longitudinally to said removable housing, said reservoir increasing in depth from one end to the other, legs secured to said removable housing for supporting said housing in a position in which the opening of said reservoir is approximately horizontal while said legs are resting on a substantially horizontal surface, a coupling ring mounted upon said housing for said heating element and a threading provided on said housing for said holder, said coupling ring being adapted to be screwed unto said threading.

ERVIN MESTITZ.